US006879114B2

United States Patent
Jales et al.

(10) Patent No.: US 6,879,114 B2
(45) Date of Patent: Apr. 12, 2005

(54) FLUORESCENT LAMP DRIVER CIRCUIT

(75) Inventors: Richard James Jales, East Leigh (GB); Barnaby Norman Wilmott, Bognor Regis (GB)

(73) Assignee: Raymarine Limited, Hampshire (GB)

( * ) Notice: Subject to any disclaimer, the term of this patent is extended or adjusted under 35 U.S.C. 154(b) by 0 days.

(21) Appl. No.: 10/399,947

(22) PCT Filed: Oct. 25, 2001

(86) PCT No.: PCT/GB01/04731
§ 371 (c)(1),
(2), (4) Date: Jul. 31, 2003

(87) PCT Pub. No.: WO02/35891
PCT Pub. Date: May 2, 2002

(65) Prior Publication Data
US 2004/0051473 A1 Mar. 18, 2004

(30) Foreign Application Priority Data
Oct. 25, 2000 (GB) .............................................. 0026111

(51) Int. Cl.[7] .............................................. H05B 37/02
(52) U.S. Cl. .................. 315/209 R; 315/219; 315/307; 315/276; 315/282; 315/DIG. 7
(58) Field of Search ............................ 315/209 R, 219, 315/239, 225, 224, 244, 247, 276, 291, 277, 279, 282, 307, 312, 362, 56, 58, DIG. 4, DIG. 7

(56) References Cited

U.S. PATENT DOCUMENTS

| | | | | |
|---|---|---|---|---|
| 5,519,289 A | * | 5/1996 | Katyl et al. ................. | 315/224 |
| 5,652,479 A | * | 7/1997 | LoCascio et al. ........... | 315/225 |
| 5,754,012 A | | 5/1998 | LoCascio et al. ........... | 315/307 |
| 5,854,538 A | | 12/1998 | Krummel .................... | 315/105 |
| 5,892,336 A | | 4/1999 | Lin et al. .................... | 315/291 |

(Continued)

FOREIGN PATENT DOCUMENTS

| | | |
|---|---|---|
| DE | 39 02 984 A1 | 8/1990 |
| EP | 0 587 923 A1 | 9/1992 |
| GB | 2 212 995 A | 8/1989 |
| GB | 2 271 479 A | 4/1994 |
| JP | 57-180064 | 11/1982 |
| JP | 60-10554 | 1/1985 |
| WO | 87/05436 | 9/1987 |

OTHER PUBLICATIONS

E. Wells: "Using the UC3871 and UC3872 Resonant Fluorescent Lamp Drivers in Floating Lamp Applications" Unitrode Design Note DN-75, 1999.

M. Martin Alfonso, D. O'Sullivan: "10 watts DC/dc smart converter" Proceedings European Space Power Conference, 1995, pp. 73–79.

Copy of European Search Report.

*Primary Examiner*—Haissa Philogene
(74) *Attorney, Agent, or Firm*—Merchant & Gould P.C.

(57) ABSTRACT

A fluorescent lamp driver circuit has regulator (SR); primary circuit of transformer (TF); electronic switches (TR2A and TR2B) and current sensing device (Rsense) connected successively in series across power supply (PSF). Controller (CTRL) is connected to create a feed back loop. The secondary circuit of transformer (TF) is coupled to fluorescent lamps (U10 and U11) via ballast capacitors (C1 and C2). Diode (D1) creates unidirectional current flow, so current sensing device (Rsense) indicates only energy input to lamps (U10 and U11). Capacitors (C1 and C2) are placed physically very close to their respective lamps, enabling good matching of currents through lamps (U10 and U11). Pulse width modulator (PM) with predetermined input is connected to regulator (SR) and, via delay circuit (TD) to controller (CTRL), thus permitting a larger dimming ratio, and further control of input power. Overvoltage detector (OVD) is connected to sense the voltage across inductor (L3) and transformer (TF) giving further control in the event of excess voltage.

28 Claims, 3 Drawing Sheets

U.S. PATENT DOCUMENTS

| | | | |
|---|---|---|---|
| 6,064,155 A | 5/2000 | Maya et al. | 315/56 |
| 6,083,021 A | 7/2000 | Lau | 439/227 |
| 6,181,066 B1 * | 1/2001 | Adamson | 315/282 |
| 6,225,742 B1 | 5/2001 | Iida et al. | 315/56 |
| 6,326,740 B1 * | 12/2001 | Chang et al. | 315/291 |

* cited by examiner

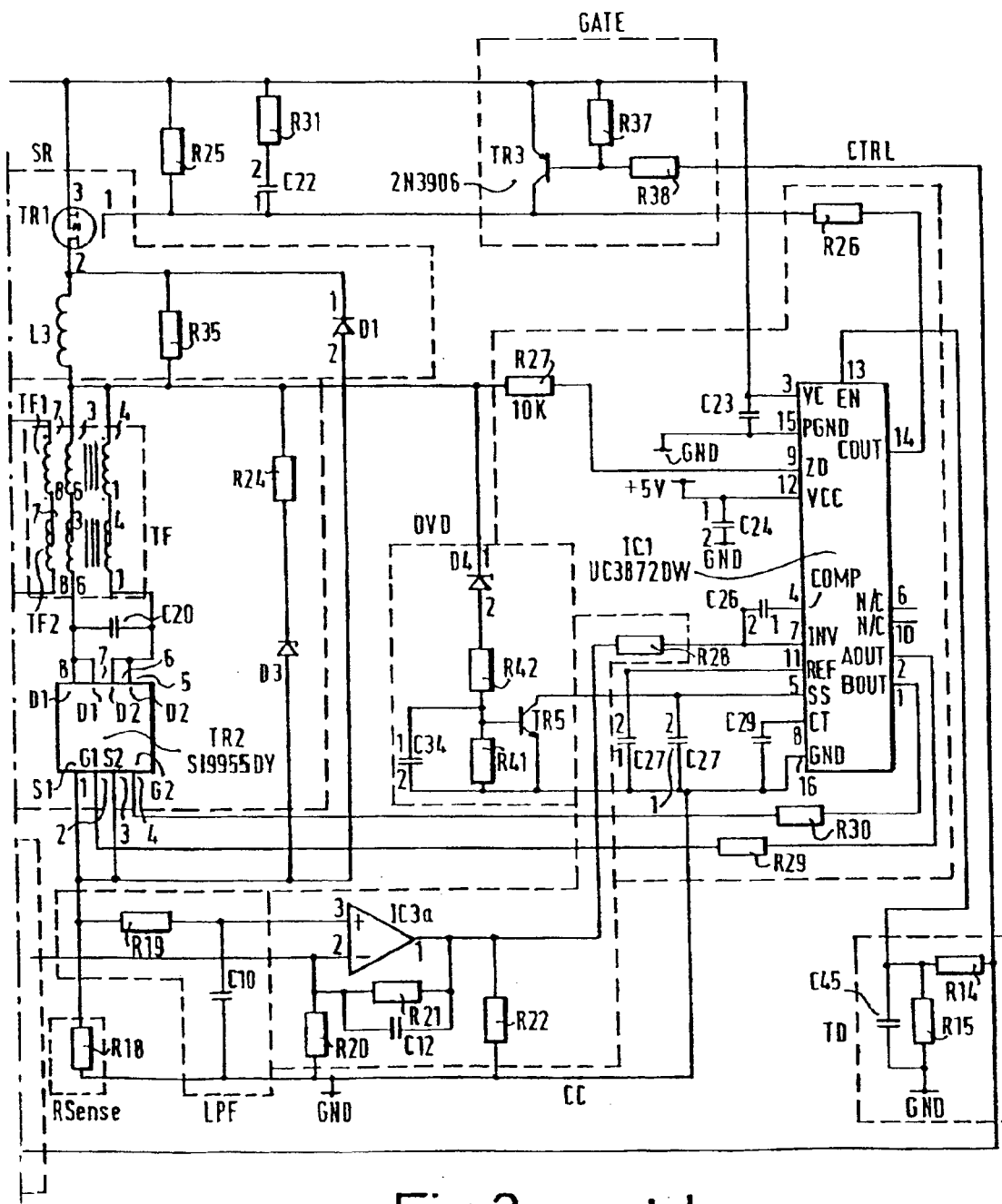
Fig.2. contd.

FLUORESCENT LAMP DRIVER CIRCUIT

FIELD OF THE INVENTION

The present invention relates to a driver circuit for driving one or more fluorescent lamps. It is particularly, but not exclusively, concerned with a circuit for driving a one or more cold-cathode fluorescent lamps which may be used for lighting a display.

SUMMARY OF THE PRIOR ART

Is it already known to drive a fluorescent lamp using a control arrangement involving feedback. In Design Note DN-75 from Unitrode Corporation, by E. Wells entitled "Using the UC3871 and UC3872 Resonant Fluorescent Lamp Drivers in Floating Lamp Applications", a driving circuit for a fluorescent lamp is disclosed in which the fluorescent lamp is driven from the secondary coils of a transformer. A regulator, the primary coil of the transformer, an electronic switch, and a current sensing device are connected successively in series across the power supply to the driving circuit, and the current sensing device generates a signal to a controller, which controller controls the regulator. The feedback is thus provided from the current sensing device via the controller to the regulator, since the regulator controls the current through the primary coils, and hence through the current sensing device.

In the circuit disclosed in the Unitrode Design Note referred to above, the regulator comprises a switch and an inductor in series. The inductor is between the switch and the transformer. In addition, the current sensing device is formed by a sense resistor, the end of which closest to the transformer is connected to the controller. Such a circuit for driving a fluorescent lamp has the advantage of reducing the thermometer effect referred to in the Unitrode Design Note referred to above.

SUMMARY OF THE INVENTION

The present invention seeks to develop the driving circuit of the general type referred to above, and has several aspects.

In a first aspect, means are provided for defining a unidirectional current path from the junction of the electronic switch and current sensing device to the junction of the switch and the inductor of the regulator. That current path is preferably formed by a diode, but alternatively other components may be used provided they define a unidirectional path.

In such an arrangement, the current through the unidirectional current path does not form part of the current fed into the circuit from the external supply. Thus the current sensing device (e.g. a sense resistor) then indicates only the energy input to the circuit, and thus gives an accurate indication of the lamp brightness. In this first aspect, the switch and inductor of the regulator, and the unidirectional current path provide an input step down (buck) switching regulator having a similar effect to the buck converter referred to in the Unitrode Design Note referred to above. That known arrangement has been found to affect the feedback loop, and thus the present invention enables this problem to be overcome.

Thus this aspect of the invention may provide a driving circuit for driving at least one fluorescent lamp, the driving circuit comprising:

a transformer, having a primary circuit and a secondary circuit for powering the fluorescent lamp;

a regulator connected between the primary circuit and a first power terminal for regulating the current through said primary circuit, the regulator having an inductor and a switch in series;

an electronic switch;

a current sensing device connected to a second power terminal for sensing a current signal; and a controller being arranged to receive the current signal and being arranged to control the regulator thereby to regulate the current through the primary circuit;

wherein the regulator, the primary circuit, the electronic switch and the current sensing device are connected successively in series;

characterised in that:

there is a unidirectional current path from the junction of the electronic switch and the current sensing device to the junction of the inductor and the switch of the regulator.

It may also provide a current regulating circuit for regulating the current through the primary circuit of a transformer, the secondary circuit of the transformer being for powering at least one fluorescent lamp, the current regulating circuit comprising:

a regulator having a first terminal for connection to a power supply and a second terminal for connection in series to the primary circuit for regulating the current through said primary circuit, the regulator having an inductor and a switch in series;

an electronic switch having a terminal for connection in series to the primary circuit;

a current sensing device for sensing a current signal in series with the electronic switch, the current sensing device having a terminal for connection to the power supply; and a controller being arranged to receive the current signal and being arranged to control the regulator thereby to regulate the current through the primary circuit;

characterised in that:

there is a unidirectional current path from the junction of the electronic switch and the current sensing device to the junction of the inductor and the switch of the regulator.

The second aspect of the invention is concerned with the connection of the transformers to the lamp or lamps. It should be noted that in this, and indeed in other aspects to discussed later, it not essential that the regulator comprises an inductor and a switch, although it will normally do so.

Normally, the or each fluorescent lamp has a ballast capacitor-associated therewith, and in conventional arrangements the ballast capacitor is placed close to the transformer, usually on the same circuit board. Electrical leads then connect those ballast capacitor(s) to the lamp(s). However, it has been found that if the driving circuit drives a plurality of lamps, a "hogging" effect may then occur, in which one lamp draws more power than the other(s), resulting in uneven illumination. The reason for this is believed to come from stray capacitances in the connecting wires between the ballast capacitors and their respective lamps, and minor variations in the connecting wires may have a significant effect. Therefore, in the second aspect of the present invention, the driver circuit drives a plurality of lamps, and each lamp has a ballast capacitor associated therewith, with each ballast capacitor being located not more than one quarter of the length of the lamp away from the corresponding lamp. Preferably, each ballast capacitor is within one tenth of the length of the lamp from the corresponding lamp. Such an arrangement, by putting the ballast capacitors as close a practical to the lamps, improves the matching of the currents when multiple lamps are used.

Thus this second aspect of the invention may provide a fluorescent lamp powering circuit comprising:

a fluorescent lamp;

a transformer having a primary circuit and a secondary circuit connected to the fluorescent lamp, the connection being via a ballast capacitor;

characterised in that:

the ballast capacitor is located not more than one quarter of the length of the fluorescent lamp away from said fluorescent lamp.

It may also provide a driving circuit according to claim 1 for driving one fluorescent lamp, wherein the transformer comprises a plurality of transformers having their primary circuits connected in series and their secondary circuits arranged for connection to one fluorescent lamp.

Preferably, as in the first aspect, the circuit further includes a regulator connected between the primary circuit and a first power terminal for regulating the current through said primary circuit;

an electronic switch;

a current sensing device connected to a second power terminal for sensing a current signal; and a controller being arranged to receive the current signal and being arranged to control the regulator thereby to regulate the current through the primary circuit;

wherein the regulator, the primary circuit, the electronic switch and the current sensing device are connected successively in series.

Preferably, the distance between each ballast capacitor and its respective lamp is the same, or at least within 25% of a common value. This further improves the uniformity of the lamp illumination, enabling the hogging effect to be minimised.

It is desirable that the voltage across the ballast capacitors is at least the same as the sustaining voltage of each tube. The ballast capacitor then represents a substantially high impedance constant current source for each lamp independently.

In this aspect, there are relatively long wires between each transformer and the ballast capacitors, rather than between the ballast capacitors and the lamps as in the prior art. This has the effect that, in this aspect of the invention, the wires are at a higher voltage than is present across the lamps, and this may require more insulation of those wires than is standard. On the other hand, the length of the leads then becomes immaterial, unlike in the prior art. If necessary, therefore, the leads to the lamps may be different lengths without compromising uniformity of illumination.

In the discussion of the second aspect of the invention above, it was assumed that there was a single transformer. This is not the case, and it is possible to have multiple transformers with their primary coils connected in series. Such an arrangement may permit there to be one transformer per lamp or multiple lamps per transformer when there are multiple lamps, but also permits multiple transformers for each lamp. While this then requires more components, the power dissipation is spread equally among the transformers, allowing smaller low cost transformers to be used. Moreover, when more power is needed, it may be easier to provide more standard transformers than to provide a larger transformer to achieve the same power.

Although this feature of having multiple transformers was discussed above in the context of the second embodiment, where there are multiple lamps, it is also possible to have multiple transformers driving a single lamp. Thus, the use of multiple transformers with their primary coils in series represents a third, independent, aspect of the present invention. It should be noted, however, where multiple transformers are used, their primary sides must be connected in series. Parallel connections have been found to be unsatisfactory, as the effect of different transformers may vary slightly, resulting in uneven currents through the transformers.

Thus, the third aspect of the invention may provide a driving circuit for driving one fluorescent lamp, the driving circuit comprising:

a plurality of transformers having their primary circuits connected in series and their secondary circuits arranged for connection to a fluorescent lamp;

a regulator connected between the primary circuits and a first power terminal for regulating the current through said primary circuits;

an electronic switch;

a current sensing device connected to a second power terminal for sensing a current signal; and a controller being arranged to receive the current signal and being arranged to control the regulator thereby to regulate the current through the primary circuits;

wherein the regulator, the primary circuits, the electronic switch and the current sensing device are connected successively in series.

Where there are multiple lamps, the third aspect may provide a driving circuit for driving a plurality of fluorescent lamps, the driving circuit comprising:

a plurality of transformers having their primary circuits connected in series and their secondary circuits arranged for connection to the fluorescent lamps;

a regulator connected between the primary circuits and a first power terminal for regulating the current through said primary circuits;

an electronic switch;

a current sensing device connected to a second power terminal for sensing a current signal; and a controller being arranged to receive the current signal and being arranged to control the regulator thereby to regulate the current through the primary circuits;

wherein the regulator, the primary circuits, the electronic switch and the current sensing device are connected successively in series.

The fourth aspect of the invention, which may be used with any of the aspects referred to above, concerns the feedback arrangements. As described above, in a driver circuit of the type used in the present invention, the output of the current sensing device is fed to a controller, which then controls the regulator. In the fourth aspect, the regulator is controlled by a pulse width modulator, the input of which is a predetermined voltage. This arrangement permits a larger dimming ratio to be achieved.

Thus, this fourth aspect may provide a driving circuit for driving at least one fluorescent lamp, the driving circuit comprising:

a transformer for powering the fluorescent lamp;

a regulator connected between the transformer and a first power terminal for regulating the current through said transformer;

an electronic switch; and a controller being arranged to receive a current signal and being arranged to control the regulator thereby to regulate the current through transformer;

wherein the regulator, the transformer and the electronic switch are connected successively in series;

characterised in that:

the circuit has a pulse width modulator arranged to receive a predetermined voltage as an input, and to generate an output to the regulator thereby to regulate further the current through the transformer.

A current sensing device may then be provided, as in e.g. the first aspect, to control the regulator in conjunction with the pulse width modulator.

This aspect may then be developed in several ways. The predetermined voltage may also be input to the feedback loop, to act as an comparison voltage to which the output of the current sensing device is compared, with the result of that comparison being fed to the controller. Secondly, the control of the regulator may be arranged so that the input from the pulse width modulator only affects the regulator when the current through the transformer has reduced to a predetermined amount. Thus, for high currents, the feedback loop operates in the normal way. At lower currents, e.g. when the power to the lamps has reduced to half or less of maximum, the input from the pulse width modulator then affects the regulator to control the subsequent dimming of the lamp below that power level. This enables a wider ratio to be achieved than known arrangements. Using this arrangement, a dimming ratio of 1000:1 may be achieved, while feedback arrangements without such pulse width modulator input can only achieve dimming ratios of the order of 20:1.

The third development of the fourth aspect of the invention provides an input to the controller from the pulse width modulator, but via a delay circuit. The controller is then connected to the electronic switch between the transformer and the current sensing means, so that the electronic switch is switched by the controller under the influence of the pulse width modulator and the delay circuit. When the signal from the pulse width modulator has been reduced sufficiently that the controller switches off the regulator, the same level of signal when delayed provides a delayed switching of the electronic switch between the transformer and the current switching device, so that the electronic switch is switched off a predetermined time after the regulator has turned off. The reason for this is that if the regulator stores power, as it will do if it contains an inductance, current may continue to flow through the transformer and this needs to be dissipated before the switches are opened. Note that, in some arrangements, the electronic switch may be formed from by a plurality of switching devices.

The fifth aspect of the present invention provides means for sensing the voltage across the transformer and possibly the inductor of the regulator, the output of which is fed to the controller. If the voltage across the transformer exceeds predetermined limits, the controller may control the regulator to turn the transformer off. The controller may also have an automatic restart feature that controls the regulator to re-power the transformer after a suitable delay.

Such voltage sensing is desirable to detect excess voltage across the transformer and other components of the driver circuit, but also maybe used to detect when the transformer is open circuit i.e. when the lamp is disconnected or the lamp and/or ballast capacitors are short circuited when the circuit prevents excess power dissipation in the transformer or other parts of the circuit.

Thus, this fifth aspect of the invention may provide a driving circuit for driving at least one fluorescent lamp, the driving circuit comprising:

a transformer for powering the fluorescent lamp;

a regulator connected between the transformer and a first power terminal for regulating the current through said transformer;

an electronic switch; and a controller being arranged to receive a current signal and being arranged to control the regulator thereby to regulate the current through transformer;

wherein the regulator, the transformer and the electronic switch are connected successively in series;

characterised in that:

the circuit has a pulse width modulator arranged to receive a predetermined voltage as an input, and to generate an output to the regulator thereby to regulate further the current through the transformer, having a current sensing device for sensing the current signal, the current sensing device being connected in series between the electronic switch and a second power terminal.

Although the five aspects of the invention discussed above are all independent, they may be used together in any combination.

BRIEF DESCRIPTION OF THE DRAWINGS

An embodiment of the present invention will now be described in detail, by way of example, with reference to the accompanying drawings, in which.

DETAILED DESCRIPTION

Figure 1:
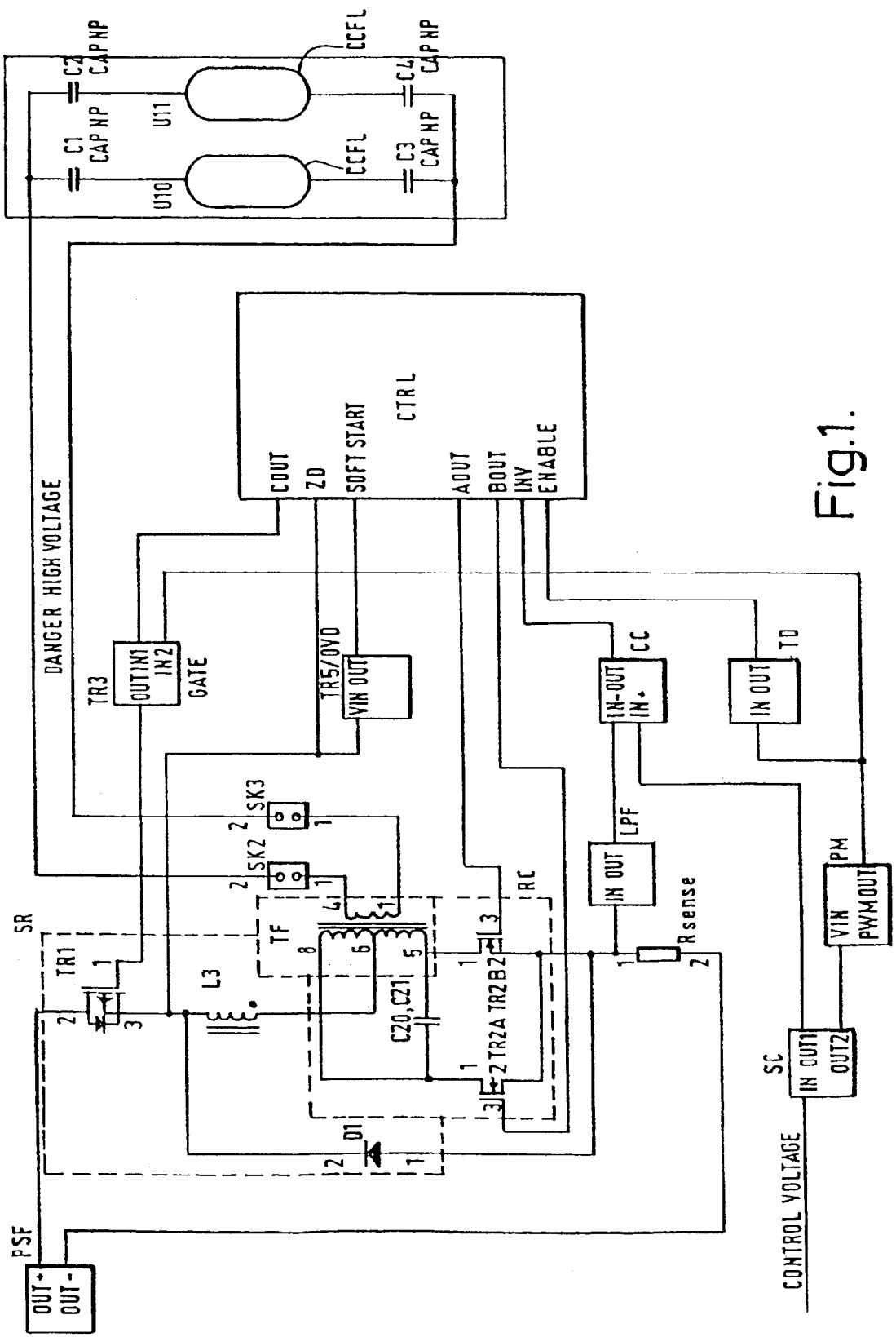
FIG. 1 is schematic block diagram of an embodiment of the present invention.

FIG. 1 shows a fluorescent lamp driver circuit connected to a pair of cold-cathode fluorescent lamps (hereinafter CCFLs) U10 and U11. The circuit has a Zero Voltage Switched (hereinafter ZVS) resonant converter RC, controlled by a processor forming a controller CTRL, feeding the primary coil of a high voltage step up transformer block TF. The secondary circuit of transformer block TF is connected, via high-voltage wires from connector terminals SK2 and SK3, to (in this embodiment) two CCFLs U10 and U11 via ballast capacitors C1 & C2. The ballast capacitors are placed physically very close to the tubes of the CCFLs (within a quarter of the length of the lamp and preferably within a tenth of the length of the lamp) and are placed symmetrically and identically for each lamp, as defined in the second aspect above.

More than one transformer can be used, and there can be more than one transformer per lamp, as defined in the third aspect above. When this is the case, the primary and secondary sides of the transformers are connected in series, ensuring that all primary and all secondary currents are identical. This reduces the possibility of transformer breakdown as each transformer is only subject to a proportion of the full voltage. The power dissipation is likewise spread between the transformers.

The ZVS resonant converter RC is formed by the transformer block TF, switches TR2A and TR2B, capacitor C20 and parts of the controller CTRL. The resonant frequency is therefore determined by the inductance of transformer block TF, capacitor C20 and the effect of the capacitance in the secondary circuit(s).

To stabilise the circuit against load variations and to provide an analog dimming means to vary the lamp brightness, the current flowing into the circuit from the power supply is measured by filtering the voltage across a sense resistor Rsense, using a low pass filter LPF. The filtered voltage is fed through a current control amplifier CC to another part of the controller CTRL. The controller CTRL feeds controlling pulses via a gate TR3 to an input buck switching regulator SR comprising switch TR1, diode D1 and inductor L3. This configuration creates a negative feedback loop which maintains a constant input current to the resonant converter circuit RC. Diode D1 is connected to the negative ends (closest to the transformer) of switches TR2 and so the current that flows around the loop D1, L3, TF1 and TR2 is not part of the current measured by the current sense resistor, as defined in the first aspect above. Consequently the current sense circuit LPF and CC only indicates the input current from the external power supply PSF and so controls the lamp brightness more accurately. Loop stabilisation is obtained in the conventional way by modifying the gain and frequency response of the control loop.

The value of the constant current in the converter circuit RC may be varied by modifying the control voltage input to the current controller CC via a signal conditioning circuit SC. One output of the conditioning circuit SC scales and offsets the control voltage to make it compatible with the desired range of amplitudes of voltage from Rsense.

Pulse width modulation (PWM) is added to the circuit, as defined in the fourth aspect above, through a pulse width modulator PM to provide a larger dimming ratio through further control of gate TR3. The resonant converter RC is thus turned on and off at a frequency significantly below its resonant frequency. The ratio of on time to off time further controls the lamp brightness. The PWM controller PM is fed from the conditioning circuit SC described above, although it may have a different scaling and offset applied to modify the operating point of the PWM circuit relative to the control voltage. The PWM circuit only starts to operate when the current control CC has already reduced the current in the circuit substantially, as defined in the second development of the fourth aspect above. In the preferred embodiment this occurs at ⅓ full power.

The output from the PWM circuit is also fed to the enable input of the controller CTRL via a delay circuit TD, as defined in the third development of the fourth aspect above. This causes TR3 (and associated components) to shut off the input power to the circuit just prior to the controller CTRL being disabled. Currents continue to flow in the primary of the transformer until the energy stored in L3 is exhausted. The efficiency is improved as the stored energy in L3 is transferred to the CCFL(s) and EMC is reduced because no large fly-back voltages and currents are created to flow through R24 and D3 (shown in FIG. 2). R24 and D3 are still fitted as part of the resonant converter RC to prevent destruction of the circuit should TR3 or the delay fail.

Overvoltage detector OVD contains transistor TR5 and is present to reduce the dissipation if the connections to the lamp circuit become shorted, as defined in the fifth aspect above. When a short exists on the transformer secondary circuit(s), a larger voltage occurs at the junction of L3 and TF1. At this point, zener diode D4 (shown in FIG. 2) conducts and turns on transistor TR5. This is connected to and resets the slow start circuit of the controller CTRL, which then reinitiates a slow increase in the circuit power. Thus the average power is significantly reduced and so overheating of the components, principally the transformer(s), prevented. In high power circuits this situation could otherwise lead to a fire.

When no lamps are connected, the voltage at the junction of L3 and TF1 increases due to no energy being taken from the secondary circuit. As in the case above, this activates TR5 and resets the slow start circuit, and the circuit operates at reduced power until the fault is remedied. Thus TR5 also serves to provide open lamp protection. The controller CTRL itself has an open lamp detection circuit which operates under these conditions, so there exists a backup in the event that either circuit fails to detect the open lamp situation.

Figure 2:
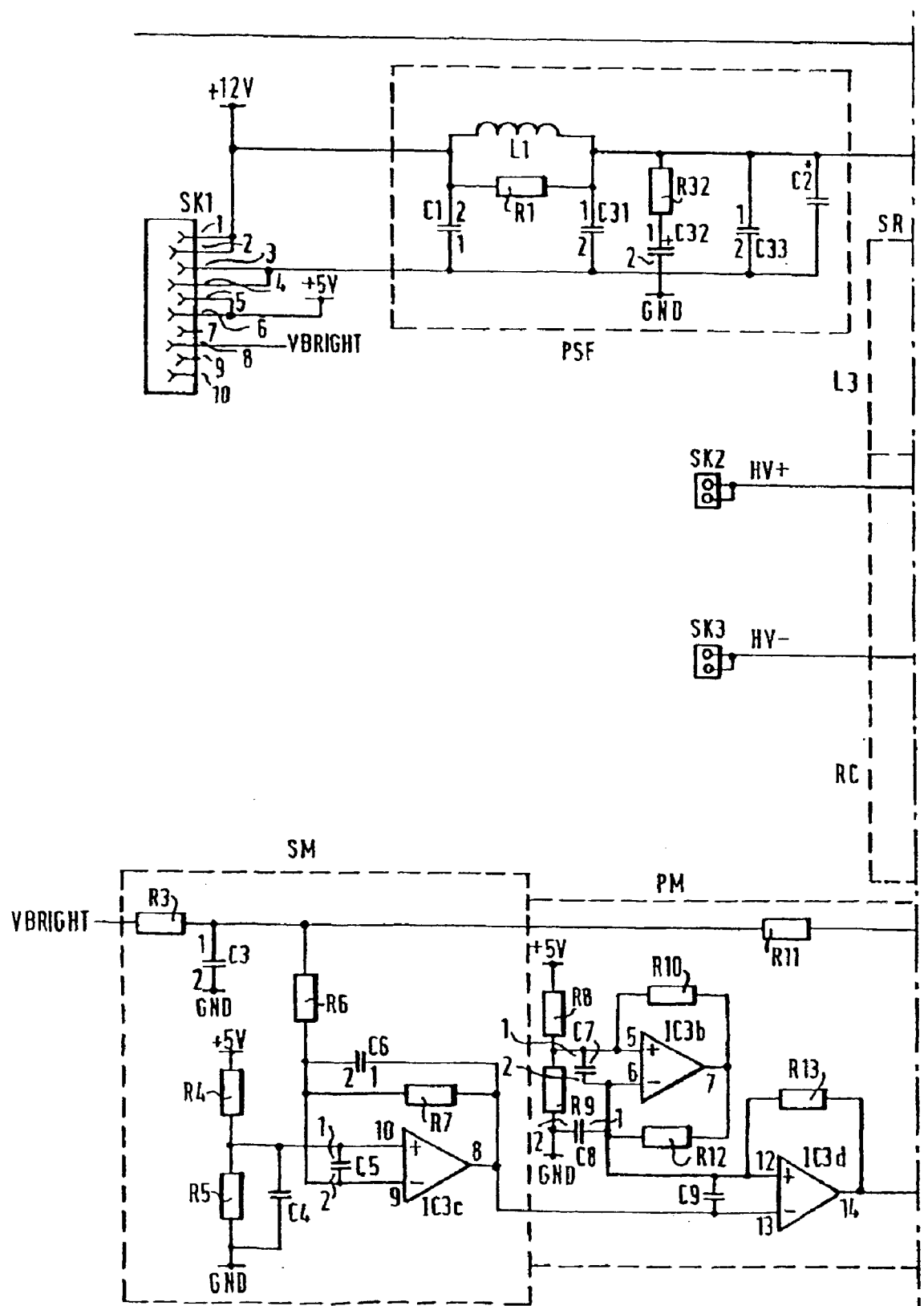
FIG. 2 is a detailed circuit diagram of part of the embodiment shown in FIG. 1.

FIG. 2 shows part of the circuit of FIG. 1 in more detail, without the CCFL(s) or ballast capacitors, which are to be connected in series to connector terminals SK2 and SK3. In this particular embodiment there are two transformers, TF1 and TF2 with the primary and secondary coils connected in series. The components make up the function blocks described with reference to FIG. 1, and are assigned to these function blocks as follows:

TR1, L3, D1 and C20 have already been mentioned as parts of the resonant converter RC and switching regulator SR shown in FIG. 1. Switches TR2A and TR2B are contained within electronic switch TR2, which is an Si9955DY.

Capacitors C1, C2, C31, C32 and C33, resistors R1 and R32 and inductance L1 are a power supply filter PSF from power source SK1.

Resistors R3, R4, R5, R6 and R7, capacitors C3, C4, C5 and C6 and integrated circuit IC3a are the signal conditioner SC for the VBRIGHT output of SK1.

Resistors R8, R9, R19, R12 and R13, capacitors C7, C8 and C9 and integrated circuits IC3b and IC3d form the pulse width modulator circuit PM.

Resistors R14 and R15 and capacitor C45 form the delay circuit TD between the output of PM and the enable input to the controller CTRL.

The controller CTRL of FIG. 1 is formed by processor IC1, which, in the preferred embodiment, is a UC3872DW, the use of which is described in the Unitrode Design Note, along with attached components R26, R27, R29, R30 (resistors), C23, C24, C26, C27., C28 and C29 (capacitors).

Resistor R18 is the sense resistor Rsense. The voltage across it is passed through a low pass filter LPF, formed by resistor R19 and capacitor C10, to the current controller CC based on IC3a.

Resistors R20, R21, R22 and R28 along with capacitor C12 form the remainder of the current controller CC.

The overvoltage detector OVD is formed by TR5, resistors R41 and R42, capacitor C34 and is controlled by zener diode D4.

The gate controlling TR1 is formed by TR3 and resistors R37 and R38.

Variations on the above embodiment are possible. In particular, the input current could be measured directly, using the voltage drop across a resistor in the connection from the positive terminal of the power supply, but it is more convenient to have this measurement referenced to ground as described above. Similarly, a true RMS measurement of the voltage across the sense resistor Rsense could be used, but the preferred embodiment produces a cheaper and simpler circuit configuration.

What is claimed is:

1. A driving circuit for driving at least one fluorescent lamp, the driving circuit comprising:
   a transformer, having a primary circuit and a secondary circuit for powering the fluorescent lamp;
   a regulator connected between the primary circuit and a first power terminal for regulating the current through said primary circuit, the regulator having an inductor and a switch in series;

an electronic switch;

a current sensing device connected to a second power terminal for sensing a current signal; and a controller being arranged to receive the current signal and being arranged to control the regulator thereby to regulate the current through the primary circuit;

wherein the regulator, the primary circuit, the electronic switch and the current sensing device are connected successively in series; and wherein there is a unidirectional current path from the junction of the electronic switch and the current sensing device to the junction of the inductor and the switch of the regulator.

2. A driving circuit according to claim 1 for driving one fluorescent lamp, wherein the transformer comprises a plurality of transformers having their primary circuits connected in series and their secondary circuits arranged for connection to one fluorescent lamp.

3. A driving circuit according to claim 1 for driving a plurality of fluorescent lamps, wherein the transformer comprises a plurality of transformers having their primary circuits connected in series and their secondary circuits arranged for connection to the fluorescent lamps.

4. A driving circuit for driving at least one fluorescent lamp according to claim 1, having a pulse width modulator arranged to receive a predetermined voltage, and to generate an output to the regulator thereby to regulate further the current through the primary circuit.

5. A driving circuit for driving at least one fluorescent lamp according to claim 4, wherein the pulse width modulator is connected to the controller via a delay circuit, and the controller is further arranged to control the electronic switch under the influence of the pulse width modulator and the delay circuit.

6. A driving circuit for driving at least one fluorescent lamp according to claim 1, having a voltage sensing device arranged to detect the voltage across the primary circuit or across the primary circuit and the inductor and to generate a signal to the controller when that voltage exceeds a predetermined limit.

7. A driving circuit for driving at least one fluorescent lamp according to claim 1, wherein the unidirectional current path has a diode defining the direction of the current path.

8. A fluorescent lamp powering circuit comprising:

a fluorescent lamp and a driving circuit according to claim 1, the secondary circuit of the transformer in the driving circuit being connected to the fluorescent lamp, the connection being via a ballast capacitor;

wherein the ballast capacitor is located not more than one quarter of the length of the fluorescent lamp away from said fluorescent lamp.

9. A fluorescent lamp powering circuit according to claim 8, wherein the ballast capacitor is located not more than one tenth of the length of the fluorescent lamp away from said fluorescent lamp.

10. A fluorescent lamp powering circuit comprising:

a plurality of fluorescent lamps and a driving circuit according to claim 1, wherein the secondary circuit of the transformer in the driving circuit is connected to the plurality of fluorescent lamps, the connection to each fluorescent lamp being via a corresponding ballast capacitor;

and wherein each ballast capacitor is located not more than one quarter of the length of the corresponding fluorescent lamp away from the corresponding fluorescent lamp.

11. A fluorescent lamp powering circuit according to claim 10, wherein each ballast capacitor is located not more than one tenth of the length of the corresponding fluorescent lamp away from the corresponding fluorescent lamp.

12. A fluorescent lamp powering circuit according to claim 10, wherein the distance between each ballast capacitor and the corresponding fluorescent lamp is within 25% of a common value.

13. A fluorescent lamp powering circuit according to claim 12, wherein the distance is the same.

14. A driving circuit for driving one fluorescent lamp, the driving circuit comprising:

a plurality of transformers having their primary circuits connected in series and their secondary circuits arranged for connection to a fluorescent lamp;

a regulator-connected between the primary circuits and a first power terminal for regulating the current through said primary circuits;

an electronic switch;

a current sensing device connected to a second power terminal for sensing a current signal; and a controller being arranged to receive the current signal and being arranged to control the regulator thereby to regulate the current through the primary circuits;

wherein the regulator, the primary circuits, the electronic switch and the current sensing device are connected successively in series.

15. A driving circuit for driving at least one fluorescent lamp, the driving circuit comprising:

a transformer for powering the fluorescent lamp;

a regulator connected between the transformer and a first power terminal for regulating the current through said transformer;

an electronic switch; and a controller being arranged to receive a current signal and being arranged to control the regulator thereby to regulate the current through transformer;

wherein the regulator, the transformer and the electronic switch are connected successively in series; and wherein the circuit has a pulse width modulator arranged to receive a predetermined voltage as an input, and to generate an output to the regulator thereby to regulate further the current through the transformer.

16. A driving circuit according to claim 15, having a current sensing device for sensing the current signal, the current sensing device being connected in series between the electronic switch and a second power terminal.

17. A driving circuit according to claim 15, wherein the transformer has a primary circuit and a secondary circuit, the primary circuit being connected in series between the regulator and the electronic switch, and the secondary circuit being connectable to the fluorescent lamp.

18. A current regulating circuit for regulating the current through the primary circuit of a transformer, the secondary circuit of the transformer being for powering at least one fluorescent lamp, the current regulating circuit comprising:

a regulator having a first terminal for connection to a power supply and a second terminal for connection in series to the primary circuit for regulating the current through said primary circuit, the regulator having an inductor and a switch in series;

an electronic switch having a terminal for connection in series to the primary circuit;

a current sensing device for sensing a current signal in series with the electronic switch, the current sensing device having a terminal for connection to the power supply; and a controller being arranged to receive the current signal and being arranged to control the regulator thereby to regulate the current through the primary circuit;

wherein there is a unidirectional current path from the junction of the electronic switch and the current sensing device to the junction of the inductor and the switch of the regulator.

19. A current regulating circuit for regulating the current through the primary circuit of a transformer according to claim 18, wherein the unidirectional current path has a diode defining the direction of the current path.

20. A fluorescent lamp powering circuit comprising:

a cold-cathode fluorescent lamp; and a transformer having a primary circuit and a secondary circuit connected to the fluorescent lamp, the connection being via a ballast capacitor;

wherein the ballast capacitor is located not more than one quarter of a length of the fluorescent lamp away from said fluorescent lamp, and wires connecting the ballast capacitor and the transformer are longer than wires connecting the ballast capacitor and the fluorescent lamp.

21. A fluorescent lamp powering circuit according to claim 20, wherein the ballast capacitor is within one tenth of the length of the fluorescent lamp from the fluorescent lamp.

22. A fluorescent lamp powering circuit according to claim 20 further including:

a regulator connected between the primary circuit and a first power terminal for regulating the current through said primary circuit;

an electronic switch;

a current sensing device connected to a second power terminal for sensing a current signal; and a controller being arranged to receive the current signal and being arranged to control the regulator thereby to regulate the current through the primary circuit;

wherein the regulator, the primary circuit, the electronic switch and the current sensing device are connected successively in series.

23. A driving circuit for driving a plurality of fluorescent lamps, the driving circuit comprising:

a plurality of transformers having their primary circuits connected in series and their secondary circuits arranged for connection to the fluorescent lamps;

a regulator connected between the primary circuits and a first power terminal for regulating the current through said primary circuits;

an electronic switch;

a current sensing device connected to a second power terminal for sensing a current signal; and a controller being arranged to receive the current signal and being arranged to control the regulator thereby to regulate the current through the primary circuits;

wherein the regulator, the primary circuits, the electronic switch and the current sensing device are connected successively in series.

24. A fluorescent lamp powering circuit comprising:

a plurality of cold-cathode fluorescent lamps; and a transformer having a primary circuit and a secondary circuit connected to the plurality of fluorescent lamps, the connection to each fluorescent lamp being via a ballast capacitor;

wherein each ballast capacitor is located not more than one quarter of a length of a corresponding fluorescent lamp away from said corresponding fluorescent lamp, and wires connecting each ballast capacitor and the transformer are longer than wires connecting each ballast capacitor to the corresponding fluorescent lamp.

25. A fluorescent lamp powering circuit according to claim 24, further including:

a regulator connected between the primary circuit and a first power terminal for regulating current through said primary circuit;

an electronic switch;

a current sensing device connected to a second power terminal for sensing a current signal; and a controller being arranged to receive the current signal and being arranged to control the regulator thereby to regulate the current through the primary circuit;

wherein the regulator, the primary circuit, the electronic switch, and the current sensing device are connected successively in series.

26. A fluorescent lamp powering circuit according to claim 24, wherein a distance between each ballast capacitor and the corresponding fluorescent lamp are within 25 percent of a common value.

27. A fluorescent lamp powering circuit according to claim 26, wherein each ballast is within one tenth of the length of the corresponding fluorescent lamp from the corresponding fluorescent lamp.

28. A fluorescent lamp powering circuit according to claim 24, wherein each ballast is within one tenth of the length of the corresponding fluorescent lamp from the corresponding fluorescent lamp.

* * * * *